Aug. 28, 1951        F. L. FESSNER        2,565,806
MILK BOTTLE HANDLE
Filed July 30, 1947
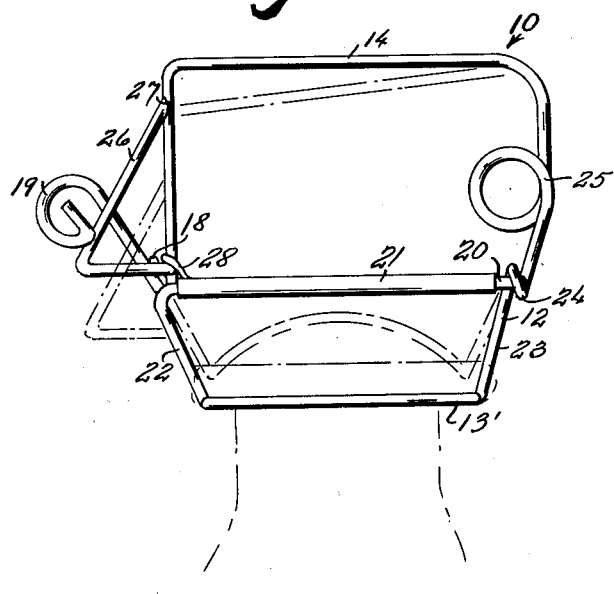
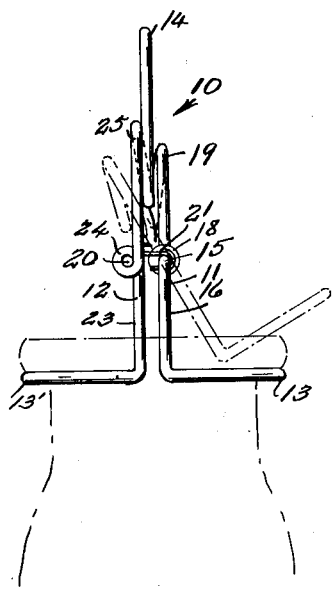
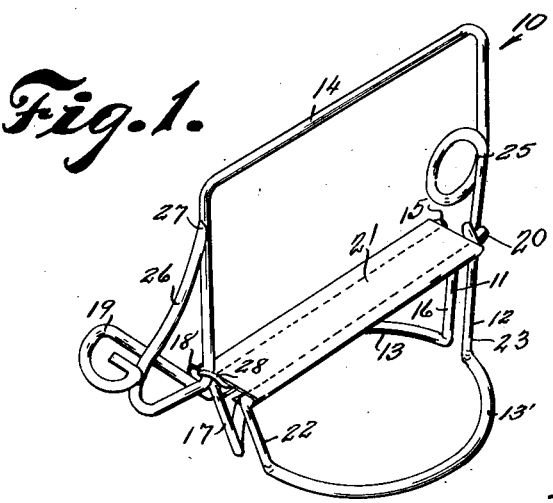
INVENTOR.
Frank L. Fessner
BY Victor J. Evans & Co.
ATTORNEYS Patented Aug. 28, 1951

2,565,806

UNITED STATES PATENT OFFICE 2,565,806

MILK BOTTLE HANDLE

Frank Leopold Fessner, Denver, Colo.

Application July 30, 1947, Serial No. 764,863

2 Claims. (Cl. 294—27)

This invention relates to a carrying handle for any standard quart or two quart size milk bottle.

An object of this invention is to provide a carrying handle that may be easily applied to or removed from a standard milk bottle.

The device provides a simple yet efficient handle for carrying milk bottles from the store to the user's home without the danger of having the bottle slip from the hand, as sometimes happens when the bottles are carried in the hand.

With the above and other objects and advantages in view, the invention consists of the novel details of construction, arrangement and combination of parts more fully hereinafter described, claimed and illustrated in the accompanying drawing in which:

Figure 1 is a perspective view of an embodiment of the invention;

Figure 2 is a side elevational view of the embodiment of the invention as applied to a milk bottle shown in dotted lines and Figure 3 is an end elevational view of the device in carrying position with releasing position shown in dotted lines.

Referring more in detail to the drawing, the bottle carrying handle embodying the invention is generally designated by the reference numeral 10. The handle comprises two carrying members 11 and 12 respectively which are formed of a heavy gauge wire strand and bent to form the gripping portions 13 and 13' and the handle portion 14.

The member 11 comprises a straight portion 15, which is bent at one end to form the inwardly inclined straight portion 16 which, at its lower end is formed integral by bending with the arcuate shaped gripping portion 13 which, at the opposite end, has formed integrally therewith by bending, the upwardly inclined straight portion 17 which is coiled at 18 over the free end of the portion 15 and then connects upwardly at the same angle of inclination to form the somewhat spiral shaped latch 19.

The member 12 has a straight portion 20 which is retained in parallel spaced relation to the portion 15 of the member 11 by means of connecting plate 21 which, at its longitudinal edges, is rolled over the portions 15 and 20, and is soldered to the portion 20, but the portion 15 is freely rotatable therein.

The portion 20, at one end, is bent to form the inwardly inclined straight portion 22, and the inclination thereof is equal to the inclination of the portion 17 so that both portions lie in similar relatively positioned inclined planes. The lower end of the portion 22 is formed integrally with, by bending, the arcuate shaped gripping portion 13', which is in the same plane as the portion 13. The portion 13', at its opposite end, is formed integrally with, by bending, the upwardly inclined straight portion 23 which is also in the same plane as the portion 16. The portion 23 is coiled over the free end of the portion 20 at 24, and at this point, it extends upwardly to form the spring coil 25. From the coil 25, the member 12 is bent to form the handle 14 at the opposite end of which the member 12 is bent to form the triangular shaped latch member 26, the free end of which is soldered at 27 to the handle 14. A guide loop 28 loosely sleeved on the handle 14 and secured to the plate 21 on the under surface thereof guides the handle of the member 12 in the releasing movement of the gripping portions 13 and 13'.

In operation, the handle 14 is pressed downwardly, being guided in its downward movement by the loop 28. Downward movement of the handle disengages the latch members 26 and 19 which are engaged as shown in Figures 2 and 3. After disengagement of these members, the member 11 is rotated in the plate 21 to expand the gripping portions 13 and 13' so they can be placed over the side of a bottle as shown in Figure 3.

The handle is then pulled upward engaging the members 19 and 26 and holding the portions 13 and 13' under the rim of the bottle. The weight of the bottle during the carrying thereof more firmly clamps the portions 13 and 13' thereon.

There has thus been provided a simple and efficient bottle carrying device, and it is believed that the preceding description will clearly explain its operation and construction to those skilled in the art.

It is also to be understood that changes in the minor details of construction may be resorted to, provided they fall within the spirit of the invention and the scope of the appended claims.

Having thus described the invention, what is claimed as new and desired to be secured by Letter Patent is:

1. A device of the character described, comprising two carrier members, a plate pivotally connecting said members together, said members being provided at their lower ends with arcuate shaped gripping portions, one of said members being formed at its upper end with a handle, a latching means, and said latching means being an extension of said handle and extending outwardly of the vertical plane of the handle and the other member being formed at its upper end with a spiraled shaped latching means adapted to engage the latching means on the handle to retain the gripping portions in compressed relation to each other, and each of said carrier members is formed from a single strand of wire and each of said members is bent to have a straight portion adapted to be engaged by the connecting plate and inclined portions joining the straight portions to the gripping portions.

2. The invention as in claim 1, wherein guide means for the handle is carried by the connecting plate.

FRANK LEOPOLD FESSNER.

REFERENCES CITED

The following references are of record in the file of this patent:

UNITED STATES PATENTS

| Number | Name | Date |
|---|---|---|
| 67,402 | Bosworth | Aug. 6, 1867 |
| 1,236,610 | Sherwood | Aug. 14, 1917 |